United States Patent [19]

Oetiker

[11] Patent Number: 5,305,499
[45] Date of Patent: Apr. 26, 1994

[54] HOSE CLAMP

[75] Inventor: Hans Oetiker, Horgen, Switzerland

[73] Assignee: Hans Oetiker AG Maschinen- und Apparate-fabrik, Zurich, Switzerland

[21] Appl. No.: 821,749

[22] Filed: Jan. 10, 1992

Related U.S. Application Data

[63] Continuation of Ser. No. 922,473, Oct. 23, 1986, abandoned, which is a continuation of Ser. No. 622,765, Jun. 20, 1984, abandoned.

[51] Int. Cl.$^5$ .............................................. B65D 63/02
[52] U.S. Cl. ................... 24/20; 24/20 CW; 24/19
[58] Field of Search .............. 24/19, 20 R, 20 CW, 24/20 TT, 23 R, 20 EE, 20 W, 271, 22, 230

[56] References Cited

U.S. PATENT DOCUMENTS

| | | | |
|---|---|---|---|
| 3,475,793 | 11/1969 | Oetiker | 24/271 X |
| 4,222,155 | 9/1980 | Oetiker | 24/20 R |
| 4,237,584 | 12/1980 | Oetiker | 24/23 EE |
| 4,299,012 | 11/1981 | Oetiker | 24/19 |
| 4,492,004 | 1/1985 | Oetiker | 24/20 R |

Primary Examiner—Laurie K. Cranmer
Attorney, Agent, or Firm—Paul M. Craig, Jr.

[57] ABSTRACT

An open clamp structure capable of withstanding very high tightening forces, with a clamping band whose overlapping inner and outer band portions are mechanically locked by a mechanical interconnection including outwardly extending hooks near the free end of the inner band portion adapted to engage with apertures near the free end of the outer band portion; for purposes of tightening the clamp structure upon engagement of at least one hook in the corresponding aperture, a deformable ear with two generally outwardly extending leg portions interconnected by a bridging portion is provided, whereby the bridging portion includes reinforcing means; at least one of the hooks is thereby a cold-deformed hook having force-engaging surface means while another hook is a combined guide and support hook having inclined guide and support surface means formed by its rear edge facing away from the free end of the inner band portion; the reinforcing means is in the form of a generally pan-shaped depression extending over a substantial part of the length and width of the bridging portion.

38 Claims, 1 Drawing Sheet

HOSE CLAMP

This application is a continuation application of my copending application Ser. No. 06/922,473, filed on Oct. 23, 1986, now abandoned, and entitled "Hose Clamp," which was a continuation application of my then copending application Ser. No. 622,765 filed on Jun. 20, 1984, now abandoned, and entitled "Hose Clamp".

The present invention relates to a clamp structure capable of withstanding very high tightening forces.

Clamp structures of the type to which the present invention relates normally fall into two categories; namely, endless clamps and open clamps. The present invention is concerned in particular with the latter type of clamps. These open type of clamp structures require some kind of mechanical connection between the overlapping band ends before the clamp can be tightened about the object to be fastened. Tightening of the clamp can thereby be achieved in various ways, for example, by so-called screw-type mechanisms or by means of a plastically deformable ear or ears, as disclosed in my prior U.S. Pat. No. 2,614,304 and my prior U.S. Pat. No. 3,082,498 which have become known as "Oetiker" ears.

More specifically, the present invention is concerned with a clamp structure utilizing a mechanical interconnection between the overlapping band portions by means of hooks extending outwardly from the inner band portion engaging in apertures in the outer band portion, and by the use of one or more so-called "Oetiker" ears for tightening the clamp structure about the object to be fastened. Such clamp structures are faced with two problems. On the one hand, any step or offset along the inner diameter of the clamp structure as a result of overlapping band portions may be the source of a possible leakage when the clamp structure is installed. However, this problem has been solved by the so-called stepless clamp structure as disclosed in my prior U.S. Pat. No. 4,315,348. The second problem faced by such clamp structures is the sufficient holding ability thereof once installed. This, in turn, depends, on the one hand, on the magnitude of the forces with which the clamp can be closed by plastic deformation of the ear without jeopardizing the intended compensating function of the ear and, on the other, on the ability of the mechanical connection to withstand the high forces with which the ear is deformed to contract the clamping band. Improvements in both aspects have been achieved heretofore by the provision of reinforcing grooves in the bridging portions of the "Oetiker" ears are disclosed in my prior U.S. Pat. No. 3,402,436. These prior art reinforcing grooves were more or less of V-shaped configuration as viewed in transverse cross section through the bridging portion in a plane containing the axis of the clamp structure and more or less in the shape of a canoe or small row boat as viewed from above. While these prior art reinforcing grooves proved extraordinarily successful, the development of new plastic materials of ever-increasing hardness such as "HYTRELL" used in practice with relatively small thicknesses, require ever-increasing clamping forces to assure complete tightness.

The ability to apply higher closing or tightening forces has been considerably improved by the mechanical connection disclosed in my prior U.S. Pat. No. 4,299,012 which involves two cold-deformed support hooks and a tab-like guide hook extending outwardly from the inner band portion and adapted to engage in corresponding apertures formed in the outer band portion, whereby the guide hook primarily serves to guide the two band portions toward one another until such time as the cold-deformed support hooks become operable by engagement of their force-engaging surfaces with corresponding apertures. However, the mechanical connection as disclosed in my prior U.S. Pat. No. 4,299,012 entails certain disadvantages stemming from the fact that the clamp structures as disclosed, for example, in FIG. 7 of this patent, are normally stamped-out from flat band material and are shipped, for reasons of economy, as flat blanks from the place of manufacture to the location of use thereof, where they are preformed into substantially circular shape prior to assembly of the object to be fastened, as disclosed, for example, in my prior U.S. Pat. No. 4,425,781. In the automatic machines used for the manufacture of the flat blanks, the angle of the guide hook is the same with the use of the same die. Thus, in the flat blank, the guide hook always has a predetermined angle. However, this angle will vary in the installed condition, depending on the diameter of the clamp structure. This then may require special attention and possible remedial action to maintain optimum conditions for the angle of the guide hook in the assembled condition of the clamp. Additionally, the guide hook which is not intended to absorb any significant tightening forces, is formed in this prior patent by a substantially rectangular tab-like member punched-out of the band material, thereby leaving a corresponding aperture in the band material. This, in turn, may lead to a tendency of the band material to buckle within the area where the band material has been reduced by the punched-out guide hook when the flat blank is bent into the approximately circular shape of the clamp.

Accordingly, it is a principal object of the present invention to provide a clamp structure which avoids the aforementioned shortcomings and at the same time permits the use of ever-higher closing or tightening forces to assure complete tightness of the installed clamp even with relatively thin, very hard plastic hose materials, such as used in connection with axle boots in the automotive industry.

The underlying problems are solved according to the present invention in that the clamp structure according to the present invention utilizes an ear provided with a reinforcing means of generally pan-shaped, relatively shallow configuration having a length and width corresponding to at least a substantial part of the length and width of the bridging portion and in that the mechanical connection between the overlapping inner and outer band portions include at least two hooks, one of which is a cold-deformed support hook and the other is a combined guide and support hook formed by a tab-like member extending generally in the longitudinal direction of the clamping band.

These and other objects, features and advantages of the present invention will become more apparent from the following description when taken in connection with the accompanying drawing which shows, for purposes of illustration only, one embodiment in accordance with the present invention, and wherein.

Figure 1:
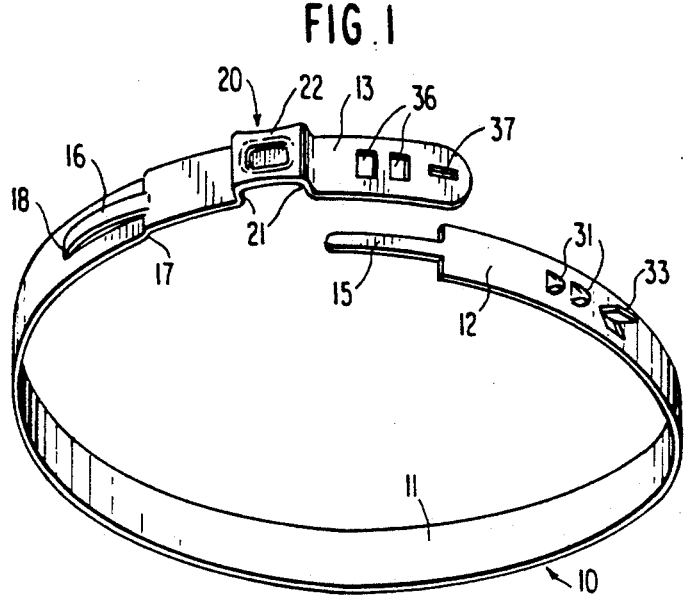
FIG. 1 is a perspective view of an open clamp structure in accordance with the present invention prior to its assembly over the object to be fastened but preformed into circular shape.
Figure 2:
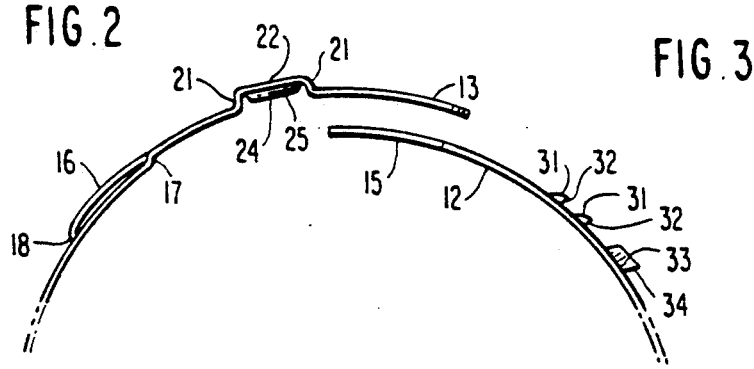
FIG. 2 is a side elevational view of a part of the clamp structure illustrated in FIG. 1.

Referring now to the drawing wherein like reference numerals are used throughout the various views to designate like parts, and more particularly to FIG. 1, the clamp structure generally designated by reference numeral 10 includes a clamping band 11 having an inner band end portion 12 and an outer band end portion 13 which are intended to overlap one another in the installed condition. The inner band portion 12 terminates in a tongue portion 15 adapted to engage in a channel-like recess formed by the pressed-out portion 16 and the steps 17 and 18 to provide a stepless internal configuration of the clamp as disclosed in my prior U.S. Pat. No. 4,299,012, reissued as U.S. Pat. No. Re. 33,934.

Additionally, the clamp structure 10 includes an ear generally designated by reference numeral 20 consisting of two generally outwardly extending leg portions 21 interconnected by a bridging portion 22 which, in turn, is provided with a reinforcing means generally designated by reference numeral 23. The reinforcing means 23 is in the shape of a relatively shallow, generally pan-shaped depression including a bottom part 24 are well as longitudinal and transverse connecting portions 25 and 26 connecting the bottom part 24 with the remaining non-depressed bridging portion 22. As can be seen from the drawing, the bottom part 24 is relatively flat over at least a substantial part of its length and width. However, if so desired, the bottom part may also have a slight curvature, particularly a concave curvature with a relatively large radius of curvature.

Figure 3:
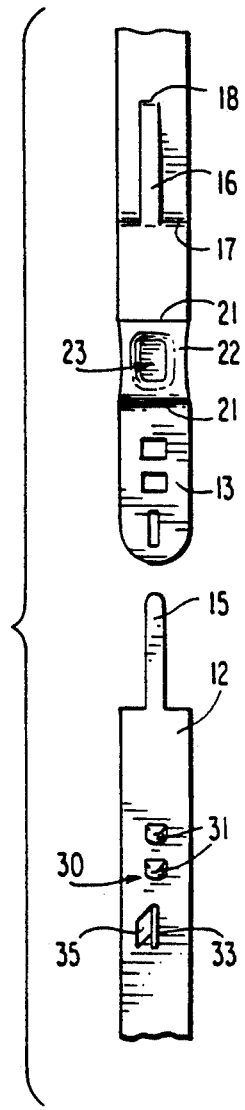
FIG. 3 is a plan view on the clamp structure of FIG. 1, as flattened out.
Figure 4:
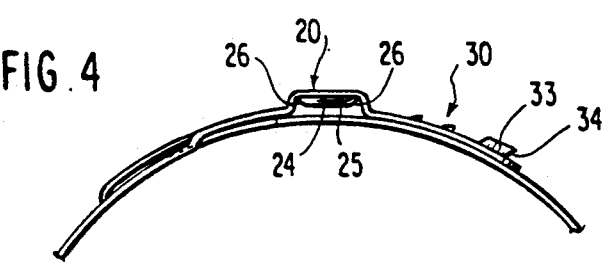
FIG. 4 is a side view, similar to FIG. 2, and showing the inner and outer band portions in the assembled condition.
Figure 5:
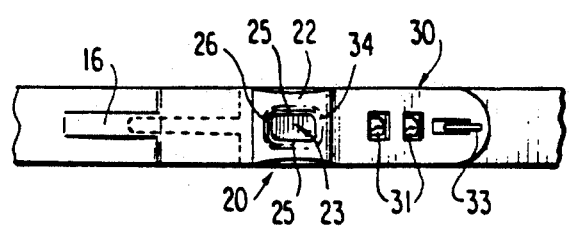
FIG. 5 is a top plan view on the assembled clamp structure of FIG. 4.

As can be seen from FIGS. 1, 3 and 5, the longitudinal connecting portions 25 and the transverse connecting portions 26 extend at an angle of nearly 90° with respect to the bottom part 24 and the remaining non-depressed bridging portion 22. In a preferred embodiment, this angle differs from a 90° angle by no more than about 20°. The connecting portions 25 and 26 pass over into the bottom part 24 and into the remaining non-depressed bridging portion 22 by way of rounded-off corners of relatively small radii of curvature. These radii of curvature may be the same or may differ from one another and also need not be radii of curvature of constant length in a given corner.

Additionally, the sides of the bridging portion 22 which extend in the circumferential direction of the clamp 10 are curved slightly concavely, as can be seen in FIG. 1 and in particular in FIG. 5, so that the width of the bridging portion 22 as viewed in a direction transverse to the longitudinal direction of the clamping band or transverse to the circumferential direction of the closed clamp, is greater in the areas near the leg portions 21 than in the central area of the bridging portion 22 located between the leg portions 21.

The area occupied by the bottom part 24 should be at least 35% of the area occupied by the non-reinforced bridging portion and preferably occupies between about 40% to about 60% thereof.

By the use of the ear 20 in accordance with the present invention, the length of the leg portions 21 can be decreased compared to the length used heretofore without impairment of the holding ability of the ear structure or its compensating properties for temperature and/or pressure changes. This is true also if relatively thicker material is used for the clamping band to further increase the tightening forces which can be applied to the ear structure during contraction of the clamp.

The mechanical interconnection generally designated by reference numeral 30 according to the present invention between the overlapping inner and outer band portions 12 and 13 includes one or more cold-deformed hooks 31, in the illustrated embodiment, two such cold-deformed hooks 31 which have force-engaging abutment surfaces 32 and are constructed as disclosed in my prior U.S. Pat. No. 4,299,012. As described in this last-mentioned patent, each cold-deformed support hook 31 is integral with the adjoining parts of the band material on all sides thereof except within the area of a generally transversely extending cut which results in the force-engaging abutment surface 32. The support hooks 31 are adapted to engage in rectangular apertures 36 in the outer band portion as also disclosed in my last-mentioned patent. According to the present invention, in addition to the cold-deformed support hooks 31, a combined guide and support hook 33 is provided which is punched and pressed-out of the inner band portion 12 and extends at substantially right angle to the outer surface of the band material. The outer band portion 13 is provided with a relatively narrow slot 37 for receiving the combined guide and support hook 33. To perform the guide function, the rear edge 34 of the combined guide and support hook 33, which faces away from the free end of the inner band portion 12, is inclined rearwardly outwardly so as to guide the inner and outer band portions 12 and 13 toward one another when the clamp structure is tightened about the object to be fastened. The tab-like combined guide and support hook 33 as well as the slot 37 are preferably located within the area of the longitudinal center axis of the band. This leaves unequal amounts of band material on the two sides of the combined guide and support hook 33 due to the fact that the area on one side thereof is reduced by the existence of the opening corresponding to the area of the punched-out combined guide and support hook 33. The combined guide and support hook is, for example, in the shape of a parallelogram leaving an opening of corresponding configuration. However, it is understood that the configuration and shape of the combined guide and support hook 33 may also be different from that shown in the drawing to match particular requirements are known to those skilled in the art.

During assembly, the combined guide and support hook 33 is extended through the slot-like aperture 37 whereafter tightening of the clamp is commenced by plastic deformation of the ear 20, for example, with the use of pneumatic pincers applied to the inner ends of the leg portions 21. As a result of the resulting circumferentially directed closing or tightening forces, the inclined guide and force-engaging surface 34 causes the inner and outer band portions 12 and 13 to move toward one another until, during continuing tightening, the cold-deformed support hooks 31 become effective to absorb tightening forces by engagement with the respective apertures 36. The combined guide and support hook 33, by reason of its particular configuration and construction, thus not only performs a guide function but also a support function until its support function is assisted by the cold-deformed support hooks 31. However, even after the cold-deformed support hooks 31 become effective, the combined guide and support hook 33 will continue to assist in the support function since it is able to absorb longitudinally directed forces without bending. Furthermore, the likelihood of buckling on the part of the band material within the area of the combined guide and support hook 33 is effectively precluded due to the resistance offered by the substantial amount of band material present on one side of the combined guide and support hook.

Additionally, the combined guide and support hook 33 offers the possibility to provide a permanent mechanical connection between the open ends of the clamp structure by a riveting action, for example, as disclosed in my U.S. Pat. No. 3,286,314.

In practice with one particular clamp, it has been possible to increase the closing force of the air, utilizing the same material as indicated by the following tabulation:

| Sample | Band Dimension | Average Tensile Strength $\delta_B$ | Closing Force | Tightness |
|---|---|---|---|---|
| A | .9 × 0.8 mm | 470 N/mm² | 380 kp | from 0 to 1.8 bar |
| B | 9 × 0.8 mm | 470 N/mm² | 460 kp | from 0 to 2 bar |
| C | 9 × 0.8 mm | 470 N/mm² | 550 kp | from 0 to 2.2 bar |
| D | 10 × 1 mm. | 500 N/mm² | 800 Kp | from 0 to 3.4 bar* |

*bellows burst at 3.4 bar wherein

A is a clamp with prior art reinforcing groove and mechanical interconnection according to U.S. Pat. No. 4,299,012.

B is a clamp with reinforced ear according to the present invention and mechanical interconnection according to U.S. Pat. No. 4,299,012.

C is a clamp with reinforced ear according to the present invention and mechanical interconnection according to the present invention.

D is a clamp with reinforced ear according to the present invention and mechanical interconnection according to the present invention, utilizing a thicker and wider material.

As can be seen from the foregoing tabulation, the present invention not only permits a substantial increase of the closing or tightening forces to be applied to the ear which the mechanical connection is able to withstand, but also permits a wider and thicker band material which in turn permits a still further increase in the closing force applied to the ear.

Additionally, the reinforced ear according to the present invention permits the ear to be kept lower than with the prior art reinforcement. Whereas the height of the ear in examples A and B amounted to 6.2 mm., the height in examples C and D could be decreased to 5 mm.

Tests with clamps embodying the present invention have demonstrated that clamps with the reinforcement in the bridging portion of the ear according to this invention permit an increase of about 150% in strength of the clamp over clamps with the prior art reinforcement in the ear thereof.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A clamp structure capable of withstanding very high tightening forces, comprising clamping band means providing in its closed condition an inner band portion and an outer band portion each terminating in a free end, mechanical interconnecting means adapted to close the clamping band means into a closed clamp structure including outwardly extending hook means near the free end of the inner band portion adapted to engage with aperture means near the free end of the outer band portion, means operable for tightening the clamp structure circumferentially about an object to be fastened after engagement of at least one hook means in the corresponding aperture means including deformable ear means, each ear means including two generally outwardly extending leg portions interconnected by a bridging portion, said bridging portion being provided with reinforcing means, at least one of said hook means being a cold-deformed deformed hook having force-engaging abutment surface means while another hook means is a pressed-out tab-like combined guide and support hook so pressed-out of the inner band portion that its connection with the inner band portion extends in the longitudinal direction of the band means to enable said another hook means to be operable to perform a guide function as also a support function resisting circumferentially directed tightening forces, and said reinforcing means being in the form of depression means extending in the longitudinal direction of the band means and of shallow configuration, said depression means being surrounded on all sides by remaining non-depressed bridging parts and having recessed bottom means recessed relative to said remaining non-recessed bridging parts, and the area of said depression means occupying, at least, about 35% of the total area of the bridging portion when in its non-reinforced condition.

2. A clamp structure according to claim 1, wherein the area of said depression means is about 40% to 60% of the area of the bridging portion.

3. A clamp structure according to claim 2, wherein the bridging portion has sides, and wherein the sides of the bridging portion extending in the longitudinal direction of the clamping band means are slightly curved concavely so that the width of the bridging portion in its area near the leg portions is slightly greater than in its central area between the leg portions.

4. A clamp structure according to claim 2, wherein the clamping band means has a longitudinal direction, and the reinforcing means includes connecting portions connecting the recessed bottom means of the depression means with the remaining non-recessed bridging parts, some of the connecting portions extending substantially in the longitudinal direction of the clamping band means and other connection portions extending substantially in a direction transverse to the longitudinal direction, and said connecting portions forming an angle within the range of about 70° to 90° with respect to the recessed bottom means and the remaining non-recessed bridging parts.

5. A clamp structure according to claim 4, wherein said connecting portions pass over into the bottom means and the remaining non-recessed bridging parts with rounded-off corners having small radii of curvature.

6. A clamp structure according to claim 2, wherein the recessed bottom means of the reinforcing means includes flat bottom means.

7. A clamp structure according to claim 6, wherein the leg portions have a length of about 5 mm. with the recessed bottom means recessed from the remaining non-recessed bridging parts by a distance less than the length of the leg portions.

8. A clamp structure according to claim 6, wherein the deformable ear means is a plastically deformable ear means which is of low height with the recessed bottom means of the depression means recessed from the remaining non-recessed bridging parts by a distance less than but approaching the length of the leg portions.

9. A clamp structure according to claim 1, wherein said another hook means has inclined guide and support surface means at its rear edge formed by the thickness of the clamping band means and facing away from the free end of the inner band portion, said guide and support surface means extending obliquely rearwardly upwardly.

10. A clamp structure according to claim 9, wherein said another hook means is of approximately parallelogram-shaped configuration with the plane containing the parallelogram extending in the longitudinal direction.

11. A clamp structure according to claim 1, wherein the longitudinally extending another hook means is so pressed-out of the band material of the inner band portion that a larger amount of band material, as viewed in the transverse direction, is left on one longitudinal side than on the other longitudinal side of said another hook means to thereby increase resistance to buckling.

12. A clamp structure according to claim 11, wherein the larger amount of band material is left in the inner band portion on the side of the opening formed by the pressed-out another hook means which is directly adjacent the another hook means.

13. A clamp structure according to claim 1, wherein more band material is left in the inner band portion on one side of said another hook means than on the other side thereof.

14. A clamp structure according to claim 1, further comprising means including a tongue-like extension at the free end of the inner band portion operable to engage in an outwardly stepped recess means in the outer band portion to provide a stepless inner configuration over the entire circumference of the clamp structure.

15. A clamp structure according to claim 1, wherein the aperture means receiving the another hook means is a relatively narrow slot extending in the longitudinal direction and leaving clamping band material on both longitudinal sides thereof to permit absorption of the very high tightening forces.

16. A clamp structure capable of withstanding very high tightening forces, comprising clamping band means providing in its closed condition an inner band portion and an outer band portion each terminating in a free end, mechanical interconnecting means adapted to close the clamping band means into a closed clamp structure including outwardly extending hook means near the free end of the inner band portion adapted to engage in aperture means near the free end of the outer band portion, means operable for tightening the clamp structure circumferentially about an object to be fastened after engagement of at least one hook means in the corresponding aperture means including deformable ear means, each ear means including two generally outwardly extending leg portions interconnected by a bridging portion, said bridging portion being provided with reinforcing means, at least one of said hook means being a cold-deformed hook having force-engaging abutment surface means while another hook means is a pressed-out tab-like combined guide and support hook pressed-out of the inner band portion in a plane which extends in the longitudinal direction of the band means and intersects the inner band portion in said longitudinal direction so that the thickness of the clamping band means forms the rear edge of the longitudinally extending another hook means and said another hook means remains integral with the inner band portion over substantially its entire length, said reinforcing means being in the form of depression means extending in the longitudinal direction of the band means and of shallow configuration, said depression means being of generally rectangular configuration surrounded on all sides by remaining non-recessed bridging parts and having bottom means recessed with respect to said remaining non-recessed bridging parts, and said bottom means being connected with said non-recessed bridging parts by connecting ports, the connecting portions which extend substantially in said longitudinal direction, extending, at least, approximately parallel to one another.

17. A clamp structure according to claim 16, wherein the area of said depression means is between about 35% to about 60% of the total area of the bridging portion as measured in its non-reinforced condition.

18. A clamp structure according to claim 16, wherein the bottom means is substantially flat in a direction transverse to the longitudinal direction.

19. A clamp structure according to claim 18, wherein the bottom means is substantially flat in the longitudinal direction.

20. A clamp structure according to claim 16, wherein the bottom means is slightly curved concavely in the longitudinal direction.

21. A clamp structure according to claim 16, wherein the leg portions have a length of about 5 mm., and wherein the bottom means is recessed from the remaining non-recessed bridging parts by a distance less than but approaching the length of the leg portions.

22. A clamp structure according to claim 16, wherein the connecting portions which extend substantially in the longitudinal direction, form an angle within the range of about 70° to 90° with respect to the bottom means and the remaining non-recessed bridging parts.

23. A clamp structure according to claim 22, wherein said bottom means is also connected with said non-recessed bridging parts by substantially transversely extending connecting portions which extend, at least, approximately parallel to one another in said transverse direction and form an angle within the range of about 70° to 90° with respect to the bottom means and the remaining non-recessed bridging parts.

24. A clamp structure according to claim 23, wherein said connecting portions pass over into the bottom means and the remaining non-recessed parts with rounded-off corners of small radii of curvature.

25. A clamp structure according to claim 16, wherein said another hook means has inclined guide and support surface means formed by its rear edge facing away from the free end of the inner band portion, and said guide and support surface means extending obliquely rearwardly upwardly.

26. A clamp structure according to claim 25, wherein said another hook means is of approximately parallelogram-shaped configuration as viewed in the axial direction of the clamp.

27. A clamp structure according to claim 25, wherein said another hook means is so pressed-out of the band material of the inner band portion that a larger amount of band material, as viewed in the transverse direction, is left on one longitudinal side than on the other longitudinal side of said another hook means to thereby increase resistance to buckling.

28. A clamp structure according to claim 27, wherein the larger amount of band material is left in the inner band portion on the side of said another hook means which is directly adjacent thereto.

29. A clamp structure according to claim 16, further comprising means including a tongue-like extension at the free end of the inner band portion operable to engage in an outwardly stepped recess means of the outer band portion to provide a stepless inner configuration over the entire circumference of the clamp structure.

30. A clamp structure according to claim 16, wherein the aperture means receiving the another hook means is a narrow longitudinally extending slot leaving clamping band material around the same to permit absorption of the very high tightening forces.

31. A clamp structure according to claim 30, wherein the inner band portion has a center area and wherein said longitudinal extending slot is located in the center area of the inner band portion.

32. A clamp structure according to claim 31, wherein said connecting portions include connecting portions extending substantially in the longitudinal direction which form an angle within the range of about 70° to 90° with respect to the bottom means and the remaining non-recessed bridging ports.

33. A clamp structure according to claim 32, wherein said connecting portions include also substantially transversely extending connecting portions which extend, at least, approximately parallel to one another in said transverse direction and form an angle within the range of about 70° to 90° with respect to the bottom means and the remaining non-recessed bridging parts.

34. A clamp structure according to claim 33, wherein said another hook means has inclined guide and support surface means formed by its rear edge facing away from the free end of the inner band portion, and said guide and support surface means extending obliquely rearwardly upwardly.

35. A clamp structure according to claim 34, wherein said another hook means is so pressed-out of the band material of the inner band portion that a larger amount of band material, as viewed in the transverse direction, is left on one longitudinal side than on the other longitudinal side of said another hook means to thereby increase resistance to buckling.

36. An open clamp structure capable of withstanding very high tightening forces, comprising clamping band means provided in its closed condition an inner band portion and an outer band portion each terminating in a free end, mechanical interconnecting means including outwardly extending hook means near the free end of the inner band portion adapted to engage in aperture means near the free end of the outer band portion, means operable for tightening the clamp structure about an object to be fastened after engagement of at least one hook means in the corresponding aperture means including deformable ear means, each ear means including two generally outwardly extending leg portions interconnected by a bridging portion, said bridging portion being provided with reinforcing means, at least one of said hook means being a cold-deformed hook having force-engaging abutment surface means while another hook means is a tab-like member pressed-out of the inner band portion in a plane which extends and intersects with the inner band portion generally in the longitudinal direction of the band means, said reinforcing means being formed by generally pan-shaped depression means having bottom means recessed with respect to and surrounded on all sides thereof by remaining non-recessed areas of the bridging portion, and the area of said depression means being delimited by substantially longitudinally extending sides and substantially transversely extending sides the area of which encompasses, at least, about 35% of the area of the bridging portion as determined in its non-reinforced condition.

37. A clamp structure according to claim 36, wherein the area of said depression means is substantially rectangular as seen in plan view.

38. A clamp structure according to claim 37, further comprising means operable in the closed clamp structure to assure a substantially smooth gap-free transition devoid of any step in the circumferential direction from the free end of the inner band material to the adjoining band portion of the band means.

* * * * *